United States Patent
Peng et al.

(10) Patent No.: US 7,457,114 B2
(45) Date of Patent: Nov. 25, 2008

(54) HEAT DISSIPATION AIR DUCT

(75) Inventors: Ying-Chao Peng, Taipei (TW); Chun-Ying Yang, Taipei (TW)

(73) Assignee: Inventec Corporation, Taipei (TW)

( * ) Notice: Subject to any disclaimer, the term of this patent is extended or adjusted under 35 U.S.C. 154(b) by 176 days.

(21) Appl. No.: 11/700,667

(22) Filed: Jan. 31, 2007

(65) Prior Publication Data

US 2008/0180905 A1    Jul. 31, 2008

(51) Int. Cl.
*H05K 7/20* (2006.01)
(52) U.S. Cl. .................. 361/687; 165/80.3; 62/259.2; 361/695
(58) Field of Classification Search .............. 362/294, 362/547; 165/80.3, 104.33, 122; 62/259.2, 62/276, 371; 361/690, 695, 697, 679–687, 361/724–727; 429/26, 120
See application file for complete search history.

(56) References Cited

U.S. PATENT DOCUMENTS 5,796,580 A * 8/1998 Komatsu et al. ............ 361/687
6,442,024 B1   8/2002 Shih
6,631,966 B2 * 10/2003 Watanabe et al. ............. 347/18

FOREIGN PATENT DOCUMENTS

TW    1252972    6/2004

\* cited by examiner

*Primary Examiner*—Hung V Duong
(74) *Attorney, Agent, or Firm*—Morris, Manning & Martin LLP; Tim Tingkang Xia

(57) ABSTRACT

A heat dissipation air duct is provided. The air duct is fixed inside a computer case, and covers a plurality of high heat-generating elements on a mainboard. The air duct includes a main air duct and an auxiliary air duct. The main air duct isolates a first air duct area inside the computer case, and an air inlet is formed in a side of the air duct area. The auxiliary air duct is fixed on the bottom of the main air duct, and is accommodated in the first air duct area, so as to further isolate a second air duct area in communication with the air inlet it the first air duct area. One of the pluralities of high-generating elements is covered by the auxiliary air duct, and is accommodated in the second air duct area.

8 Claims, 13 Drawing Sheets

HEAT DISSIPATION AIR DUCT

BACKGROUND OF THE INVENTION

1. Field of Invention

The present invention relates to a heat dissipating structure inside a computer case, and more particularly, to a heat dissipation air duct for enhancing beat dissipation of a plurality of high heat-generating elements.

2. Related Art

In order to meet the consumers' requirements on the data processing speed to complete more and more complicated programs in the shortest time, the entire industry tries to achieve the objects of higher processing speed and multiplex operation by increasing the integrity of chips. As the processing speed keeps increasing, and the chip size keeps reducing, the heat dissipation of chips in high-speed operation has become a concern of the industry that directly influences the performance and stability of a computer system. In recent years, it has been one of the most difficult problems for the industry to rapidly dissipate the waste heat generated by the chips to improve the heat dissipation efficiency of major chips in the system. As for desktop computers that are used most extensively, in order to reduce the temperature inside the computer system, the most common conventional heat dissipation method is to add various heat dissipation modules composed of heatsink fins and fans on the surface of an object requiring enhanced heat dissipation effect, and to dissipate the heat outside the computer system with a system fan in a case.

Compared with a notebook computer or a workstation server, the desktop computer has larger heat dissipation spaces between main electronic components, and thus is less likely to cause the problem that the heat cannot be dissipated. However, with the substantial improvement of the operating speed of the elements, in a current desktop computer system, the heat dissipation problem is required to be solved not only by the CPU, but also by the memory, display chip, and chips disposed on the mainboard. The simplest solution to the mentioned problem is to add a heat dissipation module on each of the components, but the cost and power load of the computer system will be increased. Furthermore, the plurality of heat dissipation modules in the case may severely affect the flow condition of the internal flow field, and increase the resistance to air flows near the heat dissipation modules. Thus, the air cannot flow by surfaces of other high heat-generating elements directly, and rapid heat convection between the air inside the case and the external via the fan cannot be realized. Accordingly, the waste heat discharged by the heat dissipation modules and other high heat-generating elements remains in the case of the computer system. With the increase of the operation time of the computer, the temperature inside the case becomes increasingly higher due to poor convection, such that the performance and stability of the computer system may be effected, and the generated high temperature may even cause damage to the chips due to over heat of the elements.

Aiming at solving the problem of poor heat dissipation, the industry has developed air ducts disposed inside the case. For example, Taiwan Patent Publication No. I252972 discloses an air duct for a heat dissipation device, in which the air duct covers a component requiring enhanced heat dissipation effect to form an air flow channel Moreover, heatsink fins are disposed on a CPU, and a fan is disposed on a side of an air duct channel, so as to stabilize a flow field of air near the component requiring enhanced heat dissipation effect, and to improve the air convection inside a case. However, the air is not directly blown towards the heatsink fins, so the enhancement of the heat dissipation effect of the CPU is limited. In addition, this design does not conform to the heat dissipation requirements directed to the high precision and high operating speed of the current CPUs, and often leads to over high temperature that affects the stability of the computer system. Therefore, the above design is not applicable nowadays.

Moreover, U.S. Pat. No. 6,442,024 discloses a fan flow guide, which controls the direction of an air flow blown by a fan with the internal structure of the fan flow guide, and concentrates and blows the air to a high heat-generating area, so as to improve the heat-dissipation efficiency of high beat-generating elements. However, as the air flow path is fixed, the heat dissipation effect of only a few high heat-generating elements can be enhanced, so this design is not applicable to a desktop computer including many high heat-generating elements, and needs further improvement.

SUMMARY OF THE INVENTION

In view of the above problems, the present invention is directed to provide a heat dissipation air duct to solve the problems and defects of the prior art.

The heat dissipation modules of the prior an often lead to poor air convection inside the case, so it is easy to cause the problem that the waste beat cannot be dissipated and the temperature in the case will become too high. The currently available air duct design cannot enhance the heat dissipation of the high heat-generating elements of the computer system effectively, or can only enhance the heat dissipation of a few high heat-generating elements Accordingly, the present invention provides a beat dissipation air duct of a case, which integrates system fans and heatsink fins, and can improve the heat dissipation efficiency of multiple high heat-generating elements.

In order to achieve the aforementioned object, the present invention provides a heat dissipation air duct, fixed inside a computer case and covering a plurality of high heat-generating elements on a mainboard. The heat dissipation air duct includes a main air duct and an auxiliary air duct. The main air duct isolates a first air duct arcs inside the computer case, and an air inlet is formed in a side of the first air duct area. The auxiliary air duct is fixed on the bottom of the main air duct, and is accommodated in the first air duct area. A second air duct area in communication with the air inlet is further isolated in the first air duct area. One of the pluralities of high heat-generating elements is covered by the auxiliary air duct, and is accommodated in the second air duct area, so as to concentrate and blow an air flow to the high heat-generating elements requiring enhanced heat dissipation effect. Thus, the beat dissipating efficiency of the high heat-generating elements inside the computer case is improved.

The effect of the present invention is that the heat dissipation air duct of a case defines a fixed air channel, and integrates a plurality of fans and heatsink fins. Thus, the flow field of air flows around the high heat-generating elements is stabilized, and the air flows blown out by the fans are blown towards the plurality of high heat-generating elements or the heatsink fins directly, so as to enhance the air convection inside the case and improve the heat dissipation efficiency of the computer system. Moreover, for the elements requiring enhanced heat dissipation effect in various computer mainframes, an appropriate small auxiliary air duct can be used in the air duct to improve the heat dissipation effect of the high heat-generating elements.

Detailed features and advantages of the present invention are described in the embodiments below, and their content is adequate for those skilled in the art to understand the technical content of the present invention and to implement the present invention. According to the content disclosed in the specification, the claims, and the drawings, those skilled in the art can easily understand the objects and advantages of the present invention.

The description on the content of the present invention above and the description on the embodiments below are used to exemplify and explain the principle of the present invention and provide further explanation on the claims of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
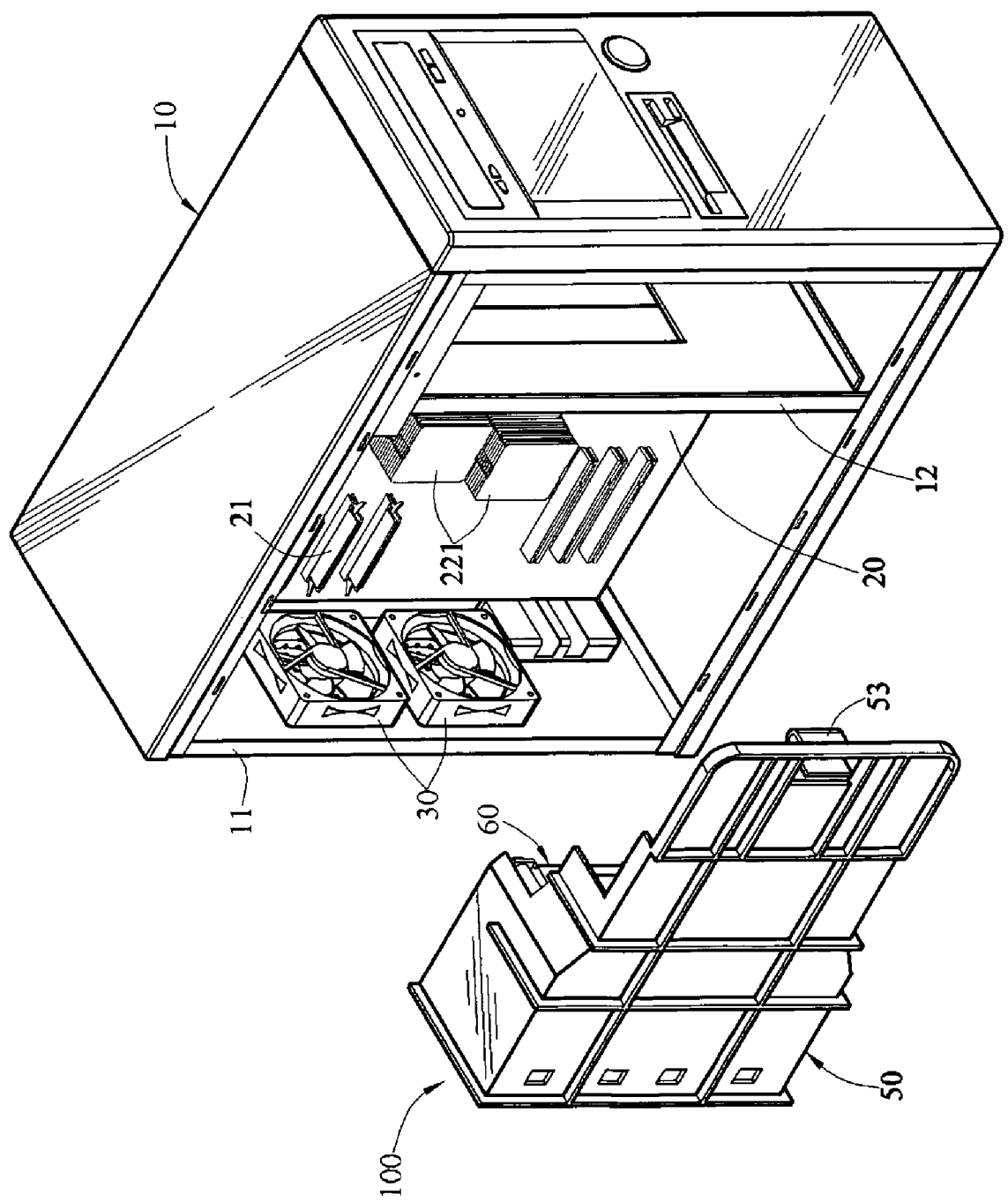
FIG. 1 is an exploded stereogram of a heat dissipation air duct and a computer case according to a first embodiment of the present invention.
Figure 2:
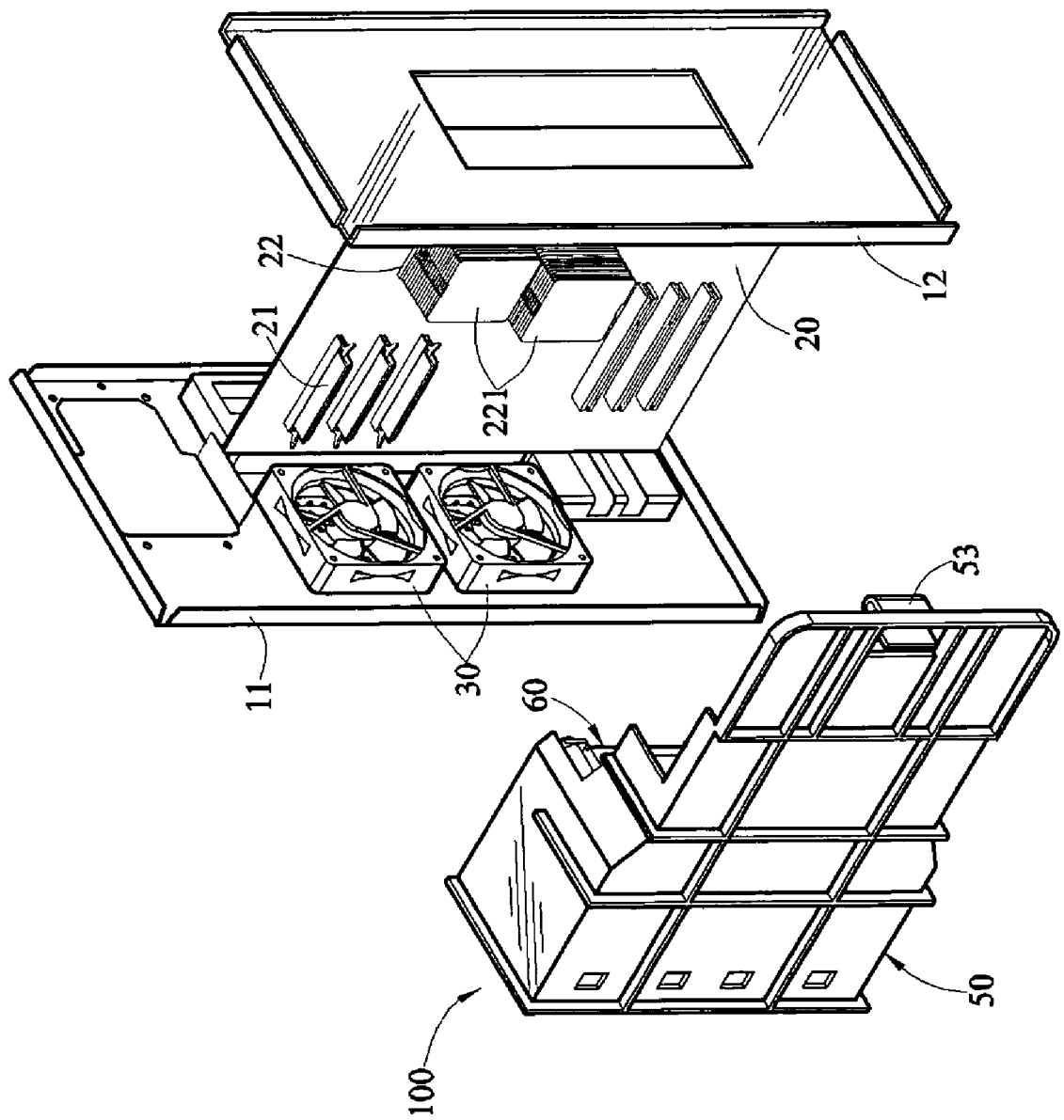
FIG. 2 is an exploded stereogram of the beat dissipation air duct, system fans, and a mainboard according to the first embodiment of the present invention.
Figure 3:
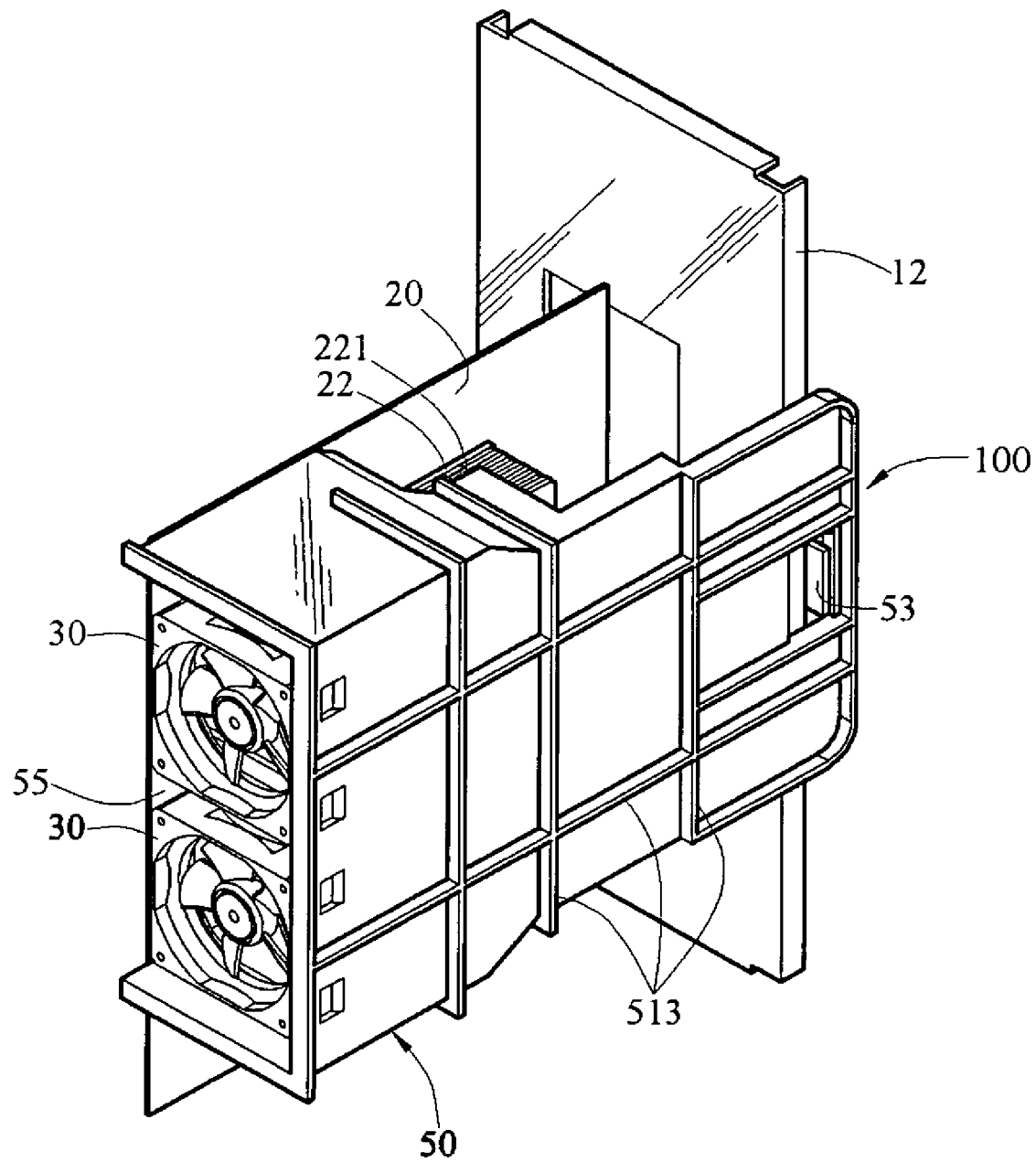
FIG. 3 is a stereogram of the heat dissipation air duct, the system fans, and the mainboard according to the first embodiment of the present invention.
Figure 4:
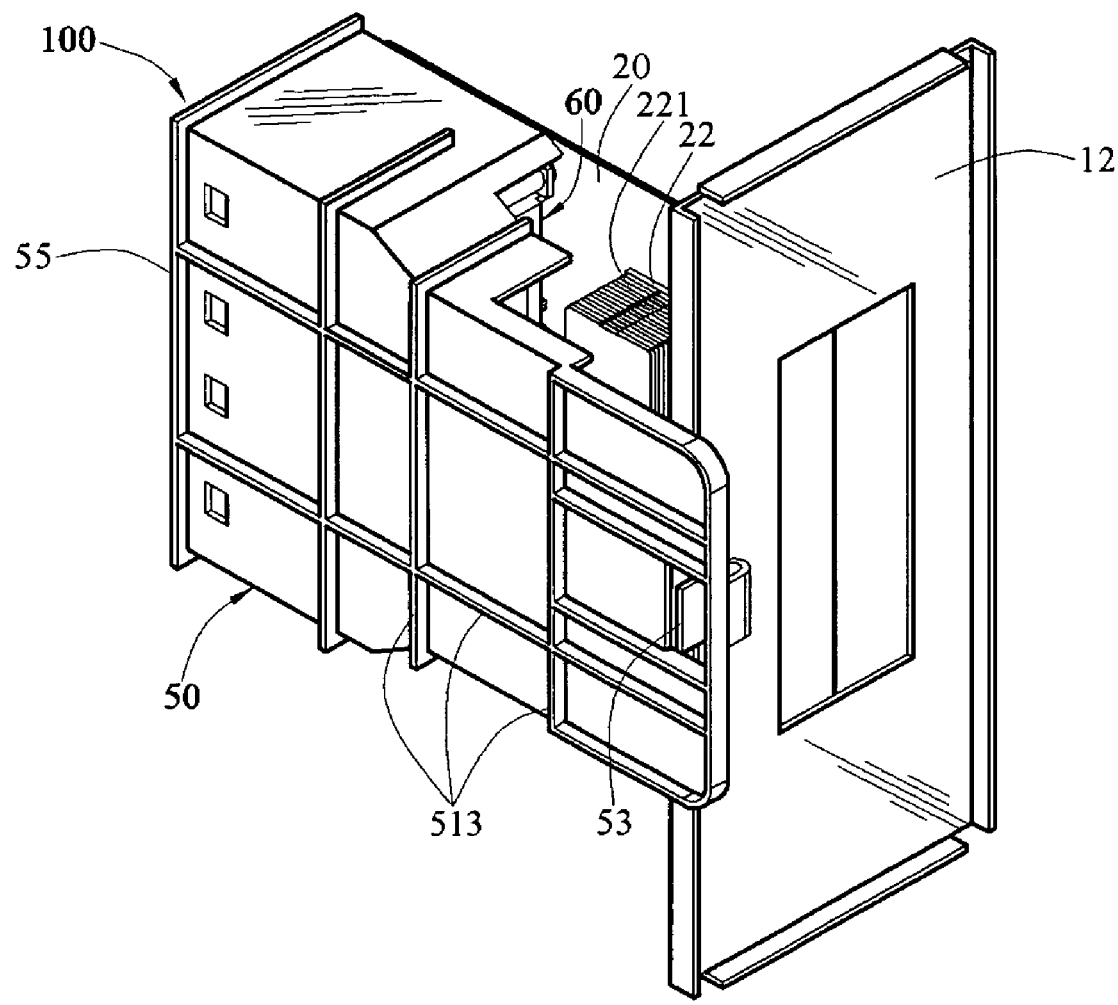
FIG. 4 is a stereogram of FIG. 3 from another angle.
Figure 5:
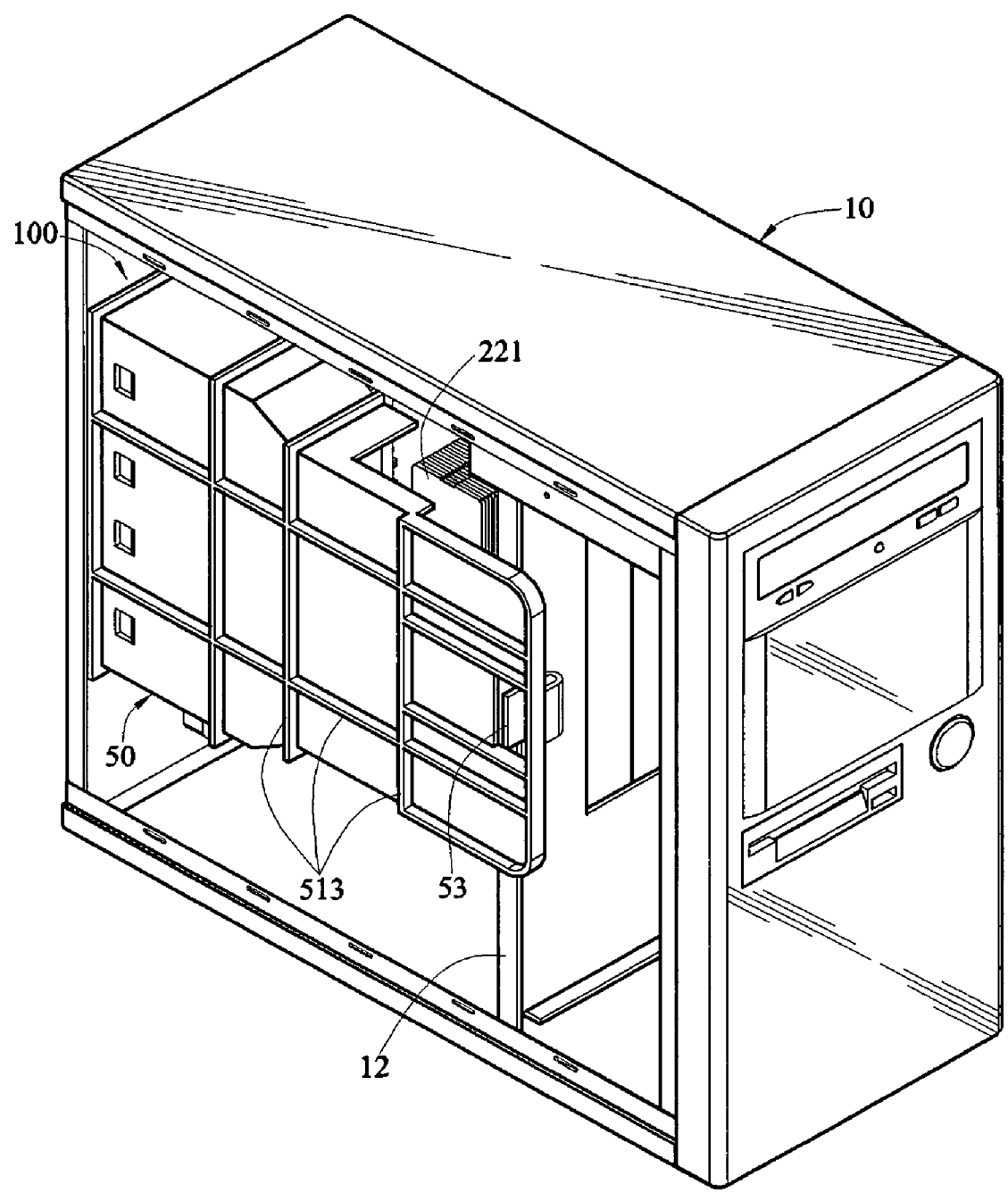
FIG. 5 is a stereogram showing the heat dissipation air duct mounted in the computer case according to the first embodiment of the present invention.
Figure 6:
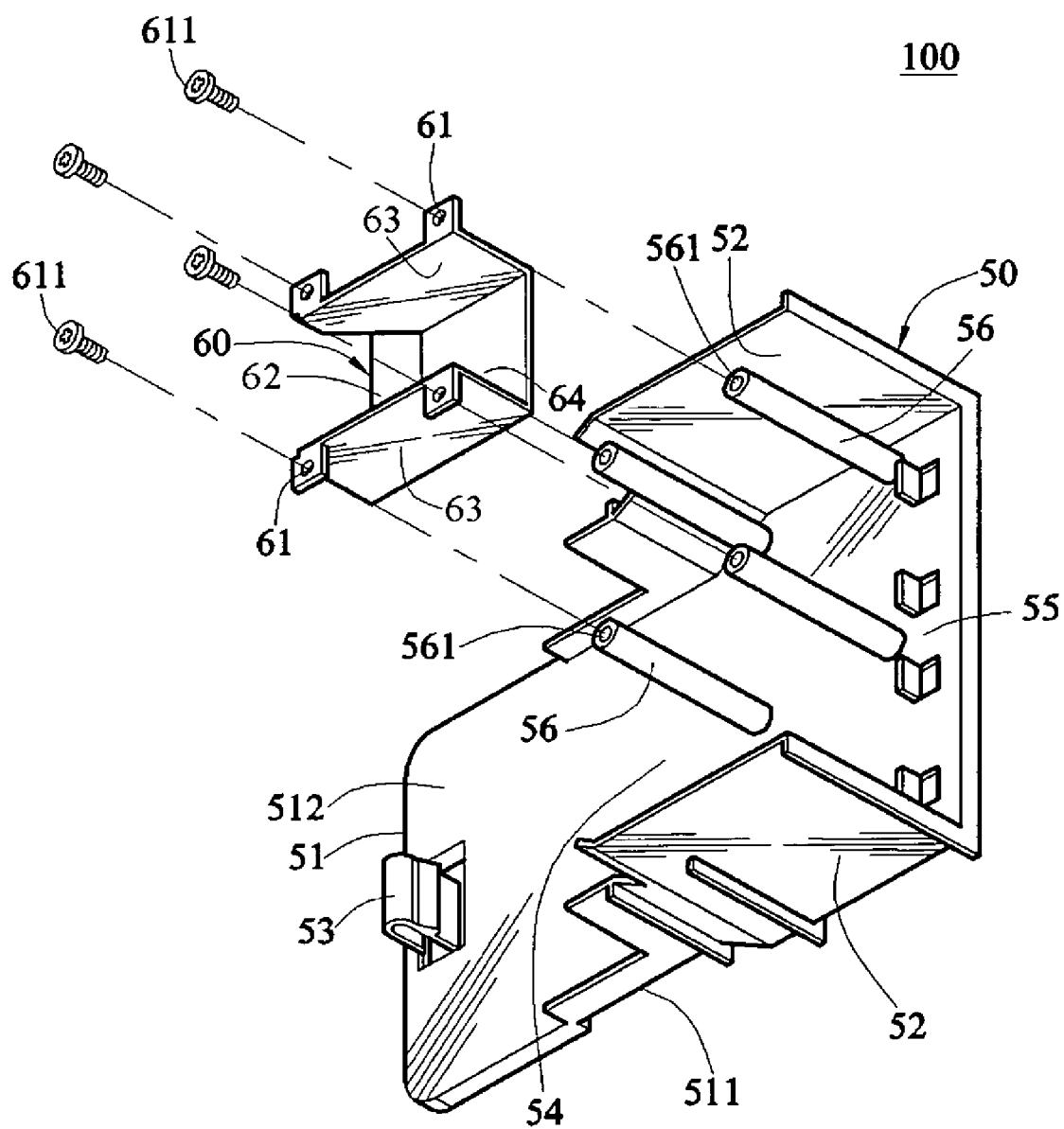
FIG. 6 is a stereogram of the heat dissipation air duct according to the first embodiment of the present invention.
Figure 7:
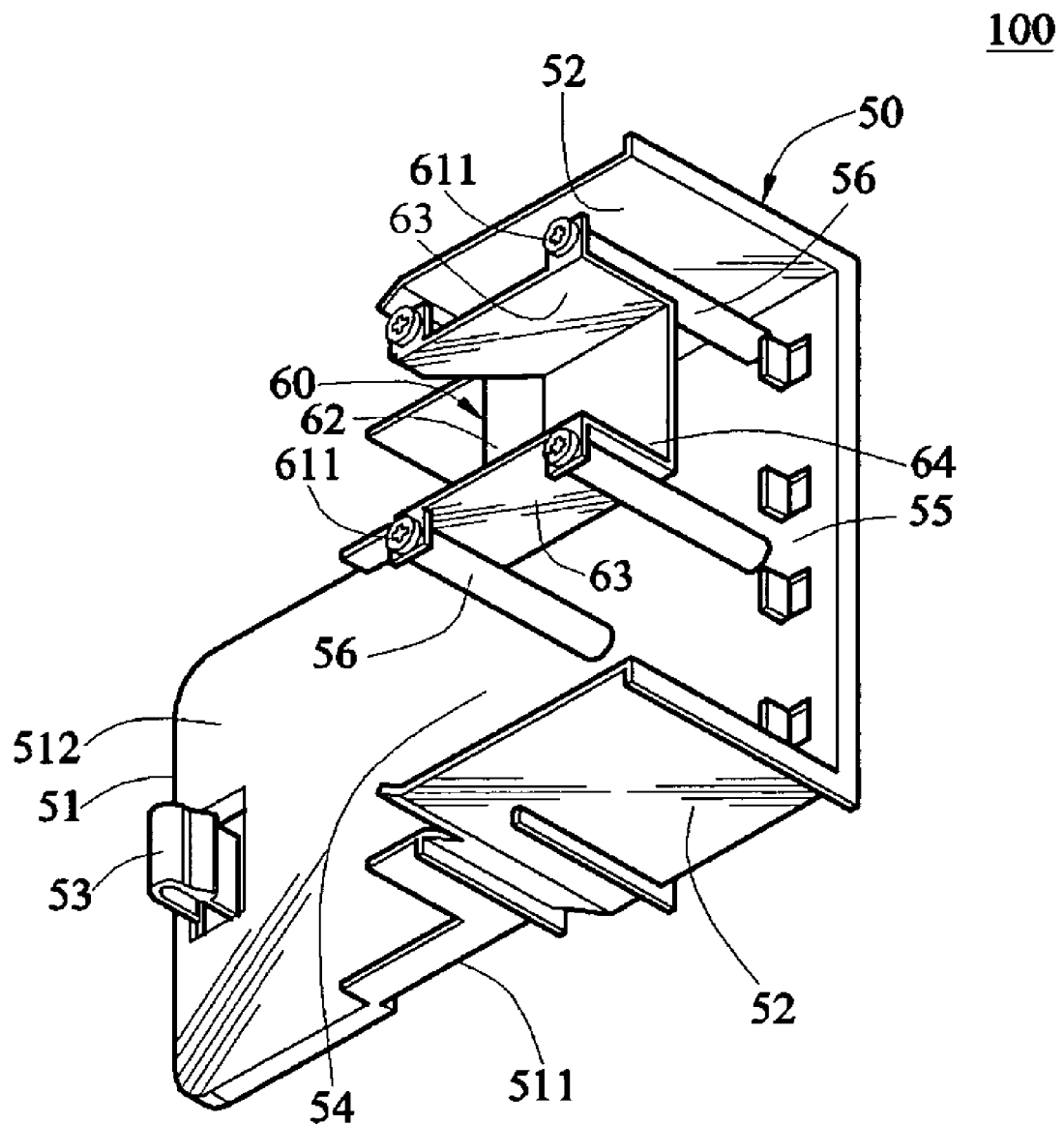
FIG. 7 is an exploded stereogram of the main air duct and the auxiliary air duct in FIG. 6.
Figure 8:
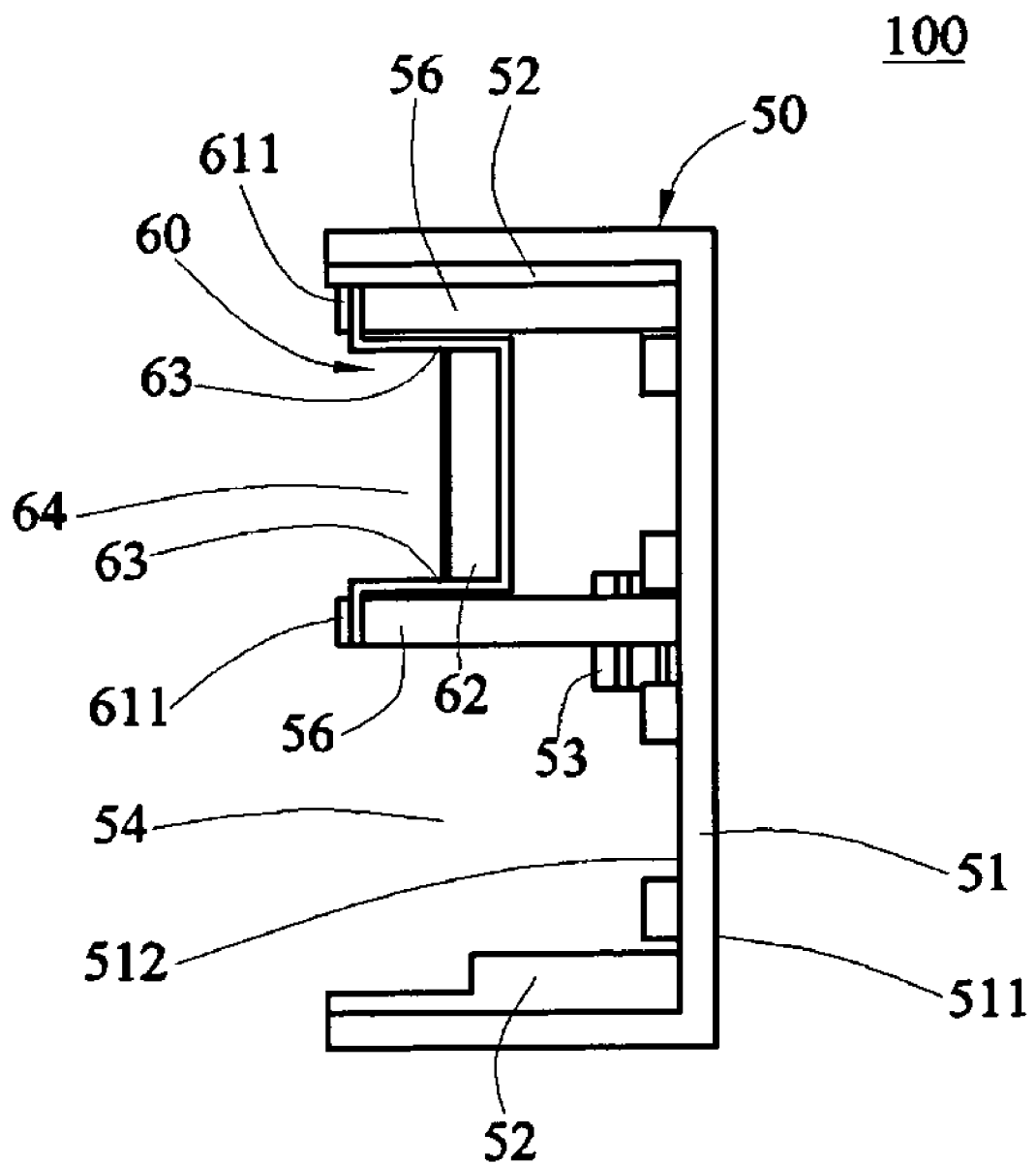
FIG. 8 is a side view of the heat dissipation air duct according to the first embodiment of the present invention.
Figure 9:
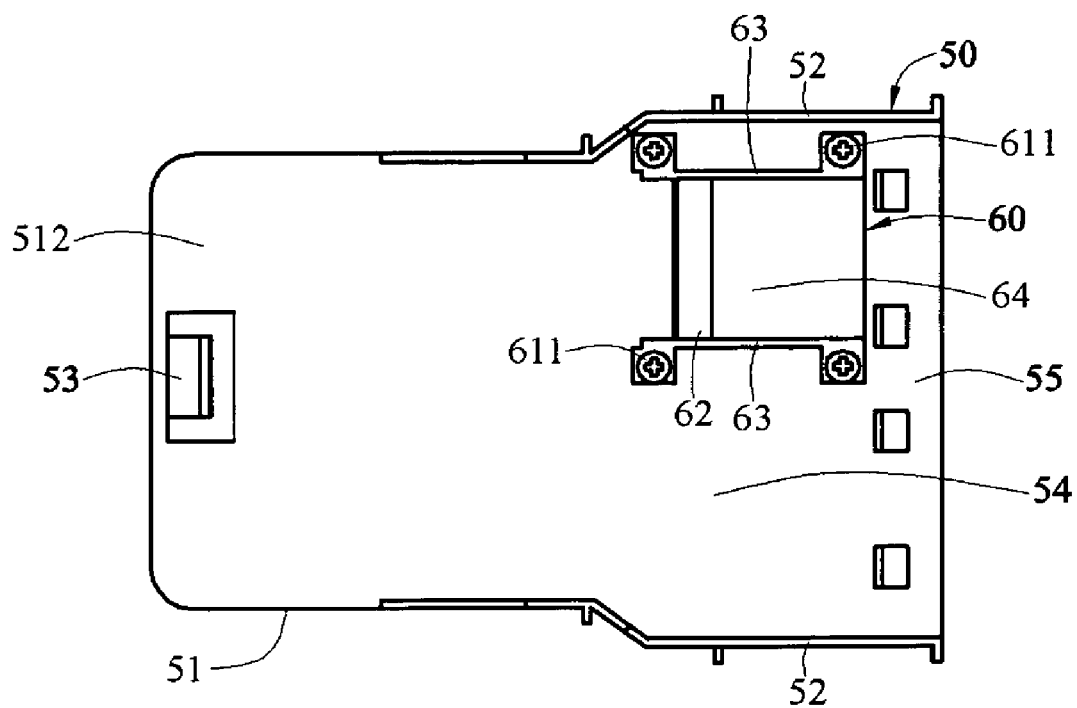
FIG. 9 is a bottom view of the heat dissipation air duct according to the first embodiment of the present invention.

To make the objective, structure, features, and function of the present invention more understandable, the present invention is illustrated below in detail with reference to the embodiments.

FIGS. 1, 2, 3, 4, and 5 show a heat dissipation air duct 100 according to a first embodiment of the present invention. The heat dissipation air duct 100 is disposed inside a computer case 10, and covers high heat-generating elements on a mainboard 20. The heat dissipation air duct 100 includes a main air duct 50 and an auxiliary air duct 60.

The computer case 10 is a hollow and slightly cuboid frame structure for accommodating various electronic elements. A partition 12 is fixed inside the computer case 10, such that the mainboard 20 is locked on one side of the partition 12, and the other side of the mainboard 20 is accordingly locked to a rear side plate 11 of the computer case 10. Thus, the mainboard 20 is fixed inside the computer case 10. A plurality of high heat-generating elements, e.g., memories 21, CPUs 22, and other high heat-generating electronic elements, is disposed on the mainboard 20, and heatsink fins 221 are disposed on the CPUs 22, so as to dissipate the waste heat generated during the operation of the CPUs 22 through thermal conduction. Two system fans 30 are disposed in parallel on an inner side of the rear side plate 11 of the computer case 10, and the number of the system fans 30 is not limited to be two. The system fans 30 are close to one side of the mainboard 20, and are corresponding to the heatsink fins 221 of the CPUs 22. In addition, the system fans 30 suck air into the computer case 10 from outside the computer case 10, and force the air inside and outside the computer case 10 to form convection, thereby enhancing the heat dissipation capability of the computer case 10.

Referring to FIGS. 6, 7, 8, and 9, the main air duct 50 is composed of a top plate portion 51 and two side plate portions 52. The top plate portion 51 has a top surface 511 and a bottom surface 512 opposite to the top surface. A plurality of protruding ribs 513 is formed on the top surface 511 in an interlaced way, so as to improve the flexing resistance and reinforce the structural strength of the top plate portion 51. A plurality of posts 56 is formed on the bottom surface 512, and a screw hole 561 is opened at the top of each of the posts 56. The two side plate portions 52 extend downward perpendicularly from two sides of the top plate portion 51, and form a first air duct area 54 with the bottom surface 512 covering the mainboard 20 and accommodating the high heat-generating elements such as the system fans 30, memories 21, and heatsink fins 221 of the CPUs 22. A buckling member 53 is disposed on the top plate portion 51 of the main air duct 50 on a side end away from the air inlet 55. The buckling member 53 matches with the partition 12 of the computer case 10, and is an elastic deformable bending piece. When the main air duct 50 covers a side of the mainboard 20, the buckling member 53 buckles the partition 12, so as to fix the main air duct 50 inside the computer case 10.

Figure 10:
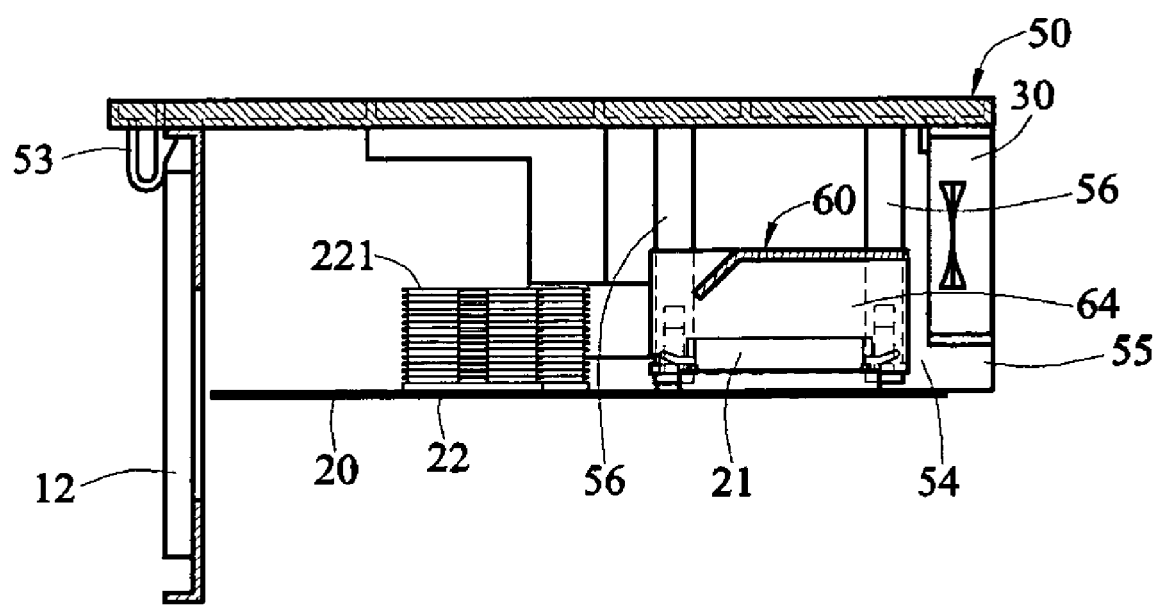
FIG. 10 is a schematic sectional view of the heat dissipation air duct according to the first embodiment of the present invention.
Figure 11:
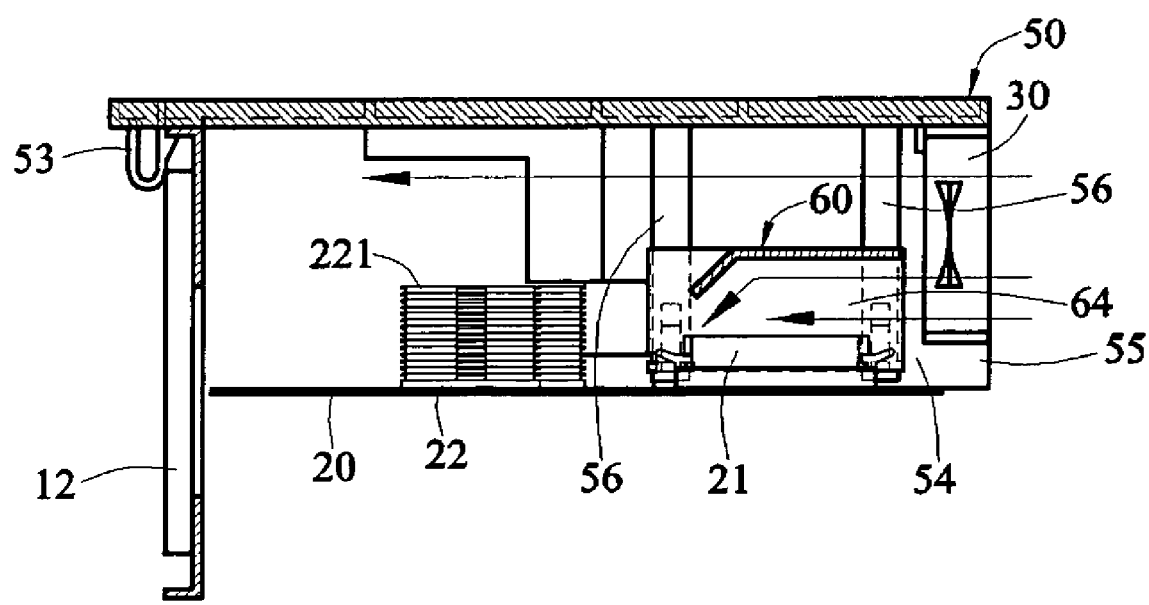
FIG. 11 is a schematic view of air flow directions in the heat dissipation air duct according to the first embodiment of the present invention.

As shown in FIGS. 10 and 11, an air inlet 55 is disposed in one side of the first air duct area 54. The air inlet 55 is adjacent to the rear side plate 11 of the computer case 10, and covers the system fans 30. The system fans 30 suck air into the computer case 10 from outside the computer case, and the generated air flow is conducted into the first air duct area 54 via the air inlet 55, so as to conduct the air flow generated by the system fans 30 to the heatsink fins 221 of the. CPUs 22 through the main air duct 50. Thus, the heat dissipation efficiency is improved, and the influence on the stability of the system caused by over high temperature is prevented.

The auxiliary air duct 60 is mounted on the lower edge of the main air duct 50, and is accommodated in the first air duct area 54. The auxiliary air duct 60 has a plurality of fixing holes 61 corresponding to the posts 56 of the top plate portion 51 of the main air duct 50. A screwing member 611 passes out of each of the fixing holes 61, and screws into the screw bole 561 of the corresponding post 56, so as to connect and fix the auxiliary air duct 60 on the bottom surface 512 of the main air duct 50. The auxiliary air duct 60 further includes an inclined bent piece 62 and two flat pieces 63 extending downward perpendicularly from two sides of the inclined bent piece 62, so as to form a second air duct area 64 in communication with the air inlet 55 and covering on the memories 21. Thus, the air flow generated by the system fans 30 are concentrated and blown towards the memories 21, and the beat dissipation efficiency is improved. However, in coordination with positions of the high heat-generating electronic elements disposed on the mainboard 20, the relative positions of the auxiliary air duct 60 and the main air duct 50 can be varied according to design requirements.

Figure 12:
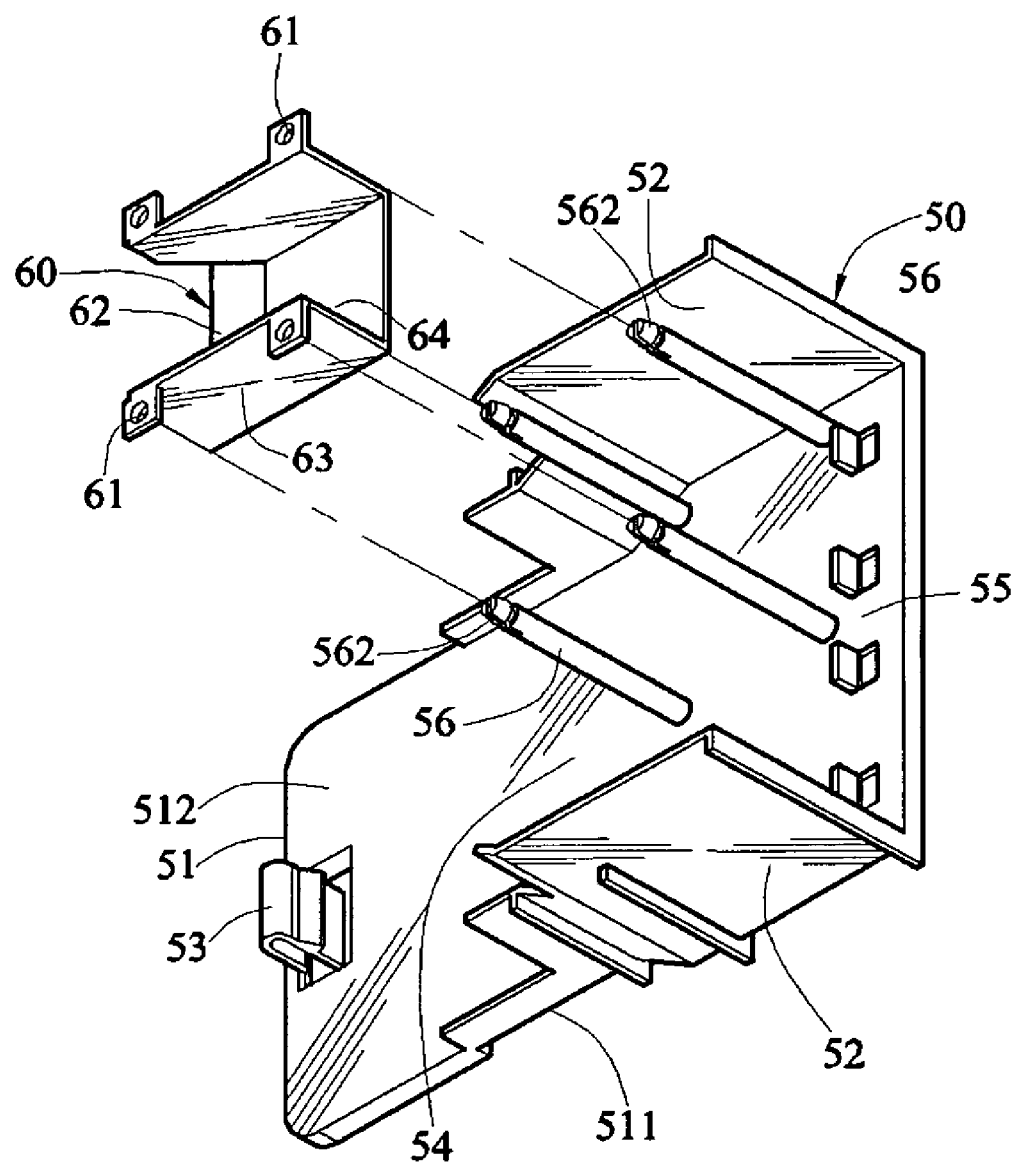
FIG. 12 is a stereogram of a heat dissipation air duct according to a second embodiment of the present invention.
Figure 13:
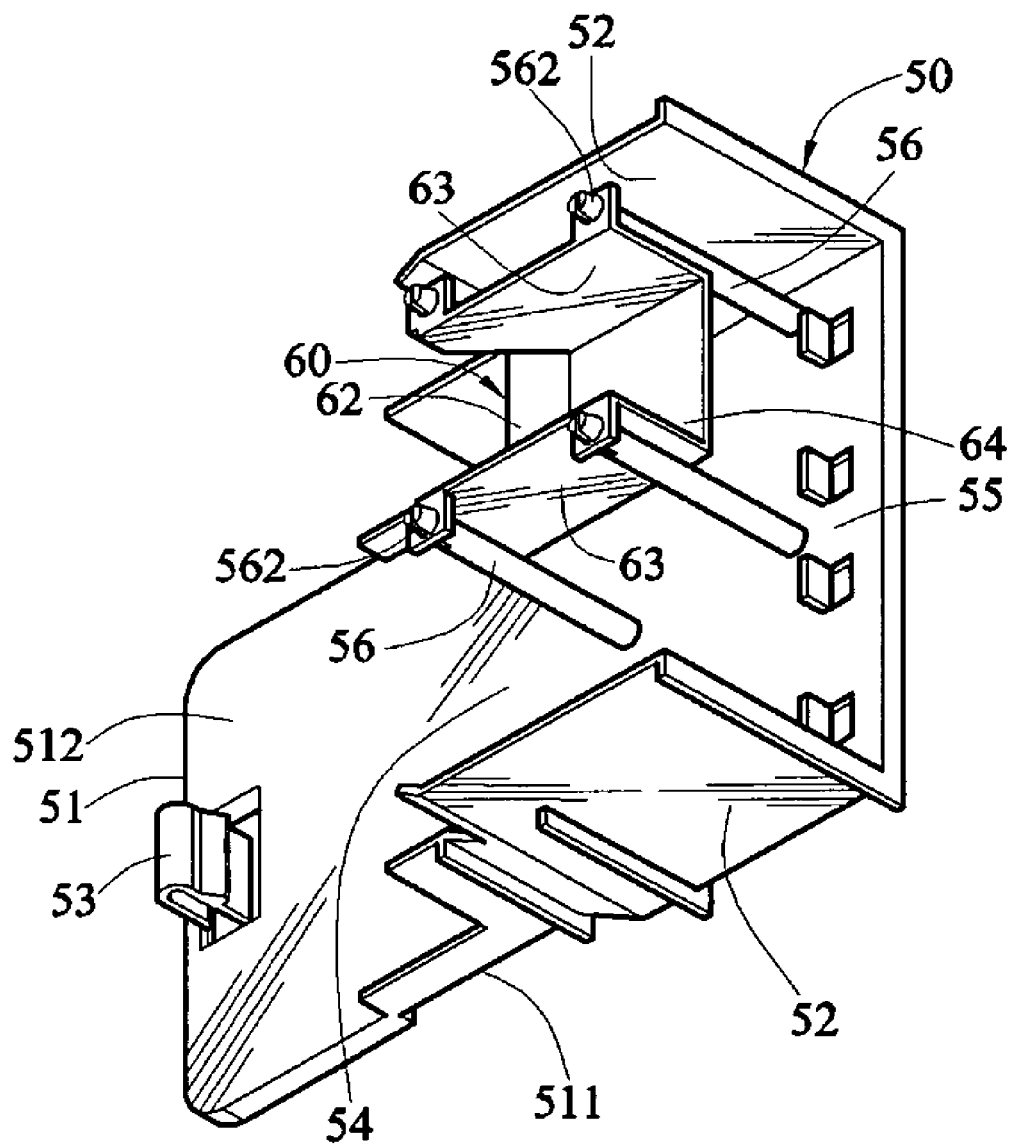
FIG. 13 is an exploded stereogram of a main air duct and an auxiliary air duct according to the second embodiment of the present invention.

FIGS. 12 and 13 show a second embodiment of the heat dissipation air duct of the present invention which is similar to the first embodiment. However, the difference between the two embodiments is that the auxiliary air duct 60 is combined with the main air duct 50 in a different way. In the second embodiment, an elastic embedded portion 562 is disposed at a front end of each of the posts 56 of the main air duct 50, and each of the embedded portions 562 is corresponding to each of the fixing holes 61 of the auxiliary air duct 60. Each of the embedded portions 562 is tapered, and has a trench that cuts away the embedded portion 562 along a radial direction. When a radial press is applied on the embedded portions 562, the embedded portions 562 will be compressed and deformed, such that the maximum diameter of the outer circumference of each of the embedded portions 562 is smaller than the diameter of the corresponding fixing hole. When the embedded portions 562 are inserted into the fixing holes 61, the embedded portions 562 undertake a radial press, and are compressed and deformed, such that the embedded portions 562 pass through the fixing holes 61, and recover after passing through the fixing holes 61, so as to insert the embedded portions 562 into the corresponding fixing holes 61. Therefore, to connect and fix the auxiliary air duct 60 to the bottom surface 512 of the main air duct 50, a user only needs to align the fixing boles 61 of the auxiliary air duct 60 with the embedded portions 562 of the main air duct 50, and press the auxiliary air duct 60 towards the top plate portion 51 of the main air duct 50, such that the embedded portions 562 are respectively inserted into the fixing holes 61.

Therefore, the beat dissipation air duct I 00 of the present invention defines a fixed air flow channel, such that the air flow generated by the system fans 30 is concentrated and blown towards the elements requiring heat dissipation on the mainboard 20. The auxiliary air duct 60 can be disposed at different positions according to different heat dissipation requirements, so as to isolate another air flow channel, such that the air flow is concentrated and directly blown towards the elements requiring enhanced heat dissipation effect. Thus, the air convection is enhanced, and the heat dissipation efficiency is improved. Moreover, the present invention can be varied for the elements requiring enhanced heat dissipation effect in different computer mainframes, thereby improving the heat dissipation efficacy on multiple high beat-generating elements simultaneously.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat dissipation air duct, fixed inside a computer case and covering a plurality of high heat-generating elements on a mainboard, the heat dissipation air duct comprising:
   a main air duct, isolating a first air duct area inside the computer case, wherein an air inlet is formed in a side of the first air duct area; and
   an auxiliary air duct, fixed on a bottom of the main air duct and accommodated in the first air duct area, and further isolating a second air duct area in communication with the air inlet in the first air duct area, wherein one of the high heat-generating elements is covered by the auxiliary air duct, and is accommodated in the second air duct area.

2. The heat dissipation air duct as claimed in claim 1, wherein the main air duct further comprises a top plate portion having a top surface and a bottom surface opposite to the top surface, and two side plate portions extending downward from two sides of the top plate portion, so as to encircle and form the first air duct area with the top plate portion.

3. The heat dissipation air duct as claimed in claim 1, wherein the air inlet is adjacent to a plurality of fans disposed in parallel on the computer case, the fans suck air into the case from outside the case, and an air flow generated by the fans is introduced into the first air duct area via the air inlet.

4. The heat dissipation air duct as claimed in claim 1, wherein the auxiliary air duct further comprises an inclined bent piece and two flat pieces extending downward from two sides of the inclined bent piece, so as to encircle and form the second air duct area.

5. The heat dissipation air duct as claimed in claim 1, wherein a plurality of protruding ribs is formed on the top surface of the top plate portion in an interlaced way.

6. The beat dissipation air duct as claimed in claim 1, wherein a buckling member is disposed on a side of the top plate portion of the main air duct away from the air inlet, and the buckling member is buckled to a partition in the computer case, for fixing the heat dissipation air duct inside the computer case.

7. The heat dissipation air duct as claimed in claim 1, wherein a plurality of posts is formed on the bottom surface of the top plate portion of the main air duct, and a screw hole is formed in a front end of each of the posts, the auxiliary air duct has a plurality of fixing holes, and a screwing member passes out of each of the fixing holes and screws into the corresponding post, so as to fix the auxiliary air duct to the main air duct.

8. The heat dissipation air duct as claimed in claim 1, wherein a plurality of posts is formed on the bottom surface of the top plate portion of the main air duct, and an embedded portion is formed in a front end of each of the posts, the auxiliary air duct has a plurality of fixing holes, the embedded portions are respectively inserted into the corresponding fixing holes, so as to fix the auxiliary air duct to the main air duct.

\* \* \* \* \*